United States Patent Office 2,986,494
Patented May 30, 1961

2,986,494

PHARMACEUTICAL COMPOSITIONS OF ETHYL
α-PHENYL-α-PIPERIDYL-(2)-ACETATE

Leon Lachman, Summit, N.J., and Louis Malspeis, New York, N.Y., assignors to Ciba Pharmaceutical Products, Inc., Summit, N.J., a corporation of New Jersey No Drawing. Filed Nov. 17, 1958, Ser. No. 774,096

4 Claims. (Cl. 167—55)

The present invention concerns certain forms of ethyl α-phenyl-α-piperidyl-(2)-acetate and salts thereof. More particularly, it relates to a racemate—hereinafter identified as the $b$-racemate—and an antipode—hereinafter identified as the $b_1$-antipode—of ethyl α-phenyl-α-piperidyl-(2)-acetate and the therapeutically acceptable acid addition salts of such compounds. Such salts are particularly those with inorganic acids, such as hydrohalic acids, e.g. hydrochloric or hydrobromic acid; sulfuric or phosphoric acids; other salts are those with organic acids, such as formic, acetic, propionic, glycolic, lactic, pyruvic, oxalic, malonic, succinic, maleic, hydroxymaleic, dihydroxymaleic, fumaric, malic, tartaric, citric, benzoic, cinnamic, mandelic, salicyclic, 4-aminosalicyclic, 2-phenoxybenzoic or 2-acetoxybenzoic, methane sulfonic, ethane sulfonic or hydroxyethanesulfonic.

It has been found that the $b$-racemate and the $b_1$-antipode of ethyl α-phenyl-α-piperidyl-(2)-acetate and the salts thereof have stimulating effects and may be used in the treatment of fatigue and drowsiness. In addition, it has also been observed that contrary to the corresponding methyl esters, the compounds of this invention are much more stable towards hydrolytic reagents and are, therefore, of advantage when used in liquid pharmaceutical preparations for injections or in elixirs for oral administration which contain such hydrolytic reagents, e.g. water. The water-soluble salts, for example, those with hydrohalic acids, e.g. hydrochloric acid, of the $b$-racemate and the $b_1$-antipode of ethyl α-phenyl-α-piperidyl-(2)-acetate are particularly suitable for such preparations.

The new compounds of this invention may be used as medicaments in the form of pharmaceutical preparations, which contain the new $b$-racemate and $b_1$-racemate of ethyl α-phenyl-α-piperidyl-(2)-acetate and the salts thereof in admixture with a pharmaceutical organic or inorganic, solid or, particularly, liquid carrier suitable for enteral, e.g. oral, or parenteral administration. They may be obtained according to standard procedures used in the art of manufacturing pharmaceutical preparations. As carrier substances there may be employed, for example, water, gelatine, sugars, starches, stearic acid and salts thereof, stearyl alcohol, talc, vegetable oils, benzyl alcohols, gums, waxes, polyalkylene glycols or any other known materials used in carriers. The pharmaceutical preparations may be in solid form, for example, as capsules, tablets or dragees, or particularly, in liquid form, for example, as solutions, e.g. isotonic saline solutions, or as suspensions, emulsions or elixirs. If desired, they may contain auxiliary substances such as preserving agents, stabilizing agents, wetting or emulsifying agents, salts for varying the osmotic pressure or buffers. They may also contain, in combination, other therapeutically useful substances.

We prefer to prefer the $b$-racemate and the $b_1$-antipode of ethyl α-phenyl-α-piperidyl-(2)-acetate and the salts thereof by esterifying the $b$-racemate or the $b_1$-antipode of α-phenyl-α-piperidyl-(2)-acetic acid with ethanol and, if desired, converting a resulting salt into the free base, and/or, if desired, resolving the resulting $b$-racemate into its antipodes and isolating the $b_1$-antipode, and/or, if desired, converting a resulting base into a salt thereof.

The esterification of the starting materials may be carried out according to standard procedures, for example, by refluxing the acid in ethanol in the presence of a mineral acid, for example, a hydrohalic acid, e.g. hydrochloric acid, which may be added in gaseous form, or sulfuric acid.

The starting material may be prepared, for example, by hydrogenating α-phenyl-α-pyridyl-(2)-acetamide in glacial acetic acid in the presence of platinum oxide and treating the resulting mixture of racemates of α-phenyl-α-piperidyl-(2)-acetamide with a concentrated aqueous solution of an alkali metal hydroxide, e.g. sodium or potassium hydroxide, in order to convert the $a$-racemate into the $b$-racemate. The $b$-racemate of α-phenyl-α-piperidyl-(2)-acetic acid is then obtained in almost pure form by hydrolysis with sulfuric acid. The $b_1$-antipode of the starting material is obtained according to known methods, for example, by preparing the salts of the above-described acid with optically active forms of tartaric acid and isolating the salt of the $b_1$-antipode of α-phenyl-α-piperidyl-(2)-acetic acid with one of the optically active tartaric acids.

Depending on the conditions used for their formation, the compounds of this invention are obtained in the form of the free bases or the salts thereof. A salt may be converted into the free base, for example, by reaction with an aqueous or alcoholic basic reagent, such as an alkali metal hydroxide, e.g. lithium, sodium or potassium hydroxide; an alkali metal carbonate, e.g. sodium carbonate or potassium hydrogen carbonate; or ammonia. A free base may be converted into its therapeutically useful acid addition salts by reaction with one of the inorganic or organic acids outlined hereinbefore, for example, by treating a solution of the base in a lower alkanol, e.g. methanol, ethanol, propanol or isopropanol; in an ether, e.g. diethylether, or in a lower alkyl lower alkanoate, e.g. methyl or ethyl acetate, or in a mixture of such solvents with the acid or a solution thereof.

The $b$-racemate of this invention may be resolved into the optically active $b_1$- and $b_2$-antipodes according to procedures known for the resolution of racemic compounds. For example, the free base of the $b$-racemate may be dissolved in a lower alkanol, e.g. methanol or ethanol, and one of the optically active forms of an acid containing an asymmetric carbon atom, or a solution thereof, for example, in the same alkanol, is then added, whereupon a salt may be isolated, which is formed by the optically active acid with one of the optically active forms of the base. Especially useful as optically active forms of salt-forming acids having an asymmetric carbon atom are D- and L-tartaric acid; the optically active forms of malic, mandelic, camphor sulfonic or quinic acid may also be employed. The resolution may also be carried out by biochemical methods. From a resulting salt, the free and optically active base may be obtained according to processes known for the conversion of a salt into a base, for example, as outlined hereinbefore. The resulting $b_1$-antipode may be converted into a therapeutically useful acid addition salt with one of the acids mentioned hereinbefore.

The following examples illustrate the invention; temperatures are given in degrees centigrade.

*Example 1*

9.76 g. of the $b$-racemate of α-phenyl-α-piperidyl-(2)-acetic acid is suspended in 100 ml. of anhydrous ethanol and refluxed with the exclusion of atmospheric moisture. Dry hydrogen chloride gas is passed through the solution until it becomes acid to Congo red; refluxing is continued for an additional three hours. The hot solution is decolorized with charcoal and filtered; 50 ml. of the ethanol of the filtrate is evaporated. A crystalline precipitate is formed upon cooling which is filtered off and washed with acetone to yield 7.16 g. of the $b$-racemate of ethyl α-phenyl-α-piperidyl-(2)-acetate hydrochloride, M.P. 215–216° after recrystallization from isopropanol.

The starting material used in the above reaction may be prepared as follows: a solution of 75 g. of α-phenyl-α-pyridyl-(2)-acetamide in glacial acetic acid is hydrogenated in the presence of 1 g. of platinum oxide at 40° C. The acetic acid is evaporated, water is added and the basic material is precipitated with aqueous sodium hydroxide. The mixture of the $b$- and the $a$-racemate of α-phenyl-α-piperidyl-(2)-acetamide is recrystallized from ethyl acetate, M.P. 173° C.

25 g. of the crude α-phenyl-α-piperidyl-(2)-acetamide, with a content of about 30 percent of the $b$-racemate, is refluxed for 10 hours with 25 g. of potassium hydroxide dissolved in 50 ml. of water. After cooling, 23.5 g. of a mixture of the two racemates of α-phenyl-α-piperidyl-(2)-acetamide, with an increased content of the $b$-racemate, precipitates, which mixture is filtered off, washed with a small amount of cold water and hydrolyzed to α-phenyl-α-piperidyl-(2)-acetic acid by boiling with 47 ml. of a 40 percent aqueous solution of sulfuric acid. The hydrolysis solution is brought to pH 6.0 with aqueous potassium hydroxide and simultaneous dilution with water to a total of 400 ml. whereupon 19 g. of the $b$-racemate of α-phenyl-α-piperidyl-(2)-acetic acid precipitates.

Example 2

By refluxing a solution of the $b_1$-antipode of α-phenyl-α-piperidyl-(2)-acetic acid hydrochloride in ethanol in the presence of hydrogen chloride gas according to the procedure given in Example 1, the $b_1$-antipode of ethyl α-phenyl-α-piperidyl-(2)-acetate hydrochloride can be obtained.

The starting material may be prepared as follows: 500 g. of crude α-phenyl-α-piperidyl-(2)-acetamide with a 68 percent content of the α-racemate is dissolved in 2000 ml. of absolute ethanol; the solution is treated with dry hydrogen chloride gas and allowed to stand for two hours at 5–10°. 425 g. of nearly pure $a$-racemate of α-phenyl-α-piperidyl-(2)-acetamide hydrochloride crystallizes. It can be converted to the free $a$-racemate of α-phenyl-α-piperidyl-(2)-acetamide by treatment with aqueous ammonia, and the base is used without further purification.

To a boiling solution of 109 g. of the $a$-racemate of α-phenyl-α-piperidyl-(2)-acetamide in 2500 ml. of ethanol is added a hot solution of 75 g. of L-tartaric acid in 2500 ml. ethanol. The mixture is allower to stand at 20° for 15 hours during which 112 g. of the α-phenyl-α-piperidyl-(2)-acetamide tartrate crystallizes; the crystalline product consists mainly of the $a_1$-antipode of the L-tartrate salt. The separated salt is dissolved in 500 ml. of water, and the free base is precipitated with 1.1 equivalents of 10 N aqueous sodium hydroxide. The preparation and crystallization of the salt by the same procedure is repeated twice using correspondingly smaller amounts of L-tartaric acid and solvent. The crude $a_1$-antipode is crystallized from ethyl acetate to yield 35 g. of the pure $a_1$-antipode of α-phenyl-α-piperidyl-(2)-acetamide, M.P. 162–163°; specific rotation: $[\alpha]_D^{22}$ —68° (as a 1 percent solution in 60 percent ethanol); solubility: 20.5 g./1000 ml. ethyl acetate (25°).

11 g. of the $a_1$-antipode of α-phenyl-α-piperidyl-(2)-acetamide is refluxed for 6 hours with a solution of 12 g. potassium hydroxide in 12 ml. of water. After cooling, 10.5 g. of a mixture of $a_1$-antipode and $b_1$-antipode of α-phenyl-α-piperidyl-(2)-acetamide precipitates. The precipitate is filtered off, washed with a small amount of cold water, and dried for half an hour at 70° under reduced pressure. The material then has a specific rotation $[\alpha]_D^{22}=+41°$ (as a 1 percent solution in 60 percent ethanol). By recrystallization from 350 ml. of ethyl acetate there is obtained a first crop of 4.9 g. of the $b_1$-antipode; specific rotation: $[\alpha]_D^{22}$ +65° (as a 1 percent solution in 60 percent ethanol); solubility: 8.7 grams per liter/1000 ml. of ethyl acetate (25°). By systematic fractional crystallization it is possible to regenerate from the mother liquors further quantities of the $b_1$-antipode. in addition to 2.5 g. of recovered starting material. Yet it is preferable to subject the combined mother liquor products of the first $b_1$-antipode crystallization to a further alkaline treatment, whereupon an additional crop of pure $b_1$-antipode can be separated, again by a single crystallization operation from ethyl acetate. This procedure is repeated until practically the entire quantity of the $a_1$-antipode is converted into the $b_1$-antipode of the α-phenyl-α-piperidyl-(2)-acetamide, M.P. 170–171°.

From 4.5 g. of the $b_1$-antipode of α-phenyl-α-piperidyl-(2)-acetamide there is obtained by refluxing for 6 hours with 14.5 g. of 6 N hydrochloric acid and subsequent crystallization 5.0 g. of the $b_1$-antipode of α-phenyl-α-piperidyl-(2)-acetic acid hydrochloride, M.P. 207–208°; specific rotation: $[\alpha]_D^{22}$ +63° (as a 1 percent solution in water).

Example 3

Pharmaceutical compositions of the $b$-racemate and the $b_1$-antipode of ethyl α-phenyl-α-piperidyl-(2)-acetate and a salt thereof may be obtained according to methods used for the manufacture of such preparations.

Especially useful are liquid pharmaceutical compositions, which contain from about 0.1 to about 10 percent of the active material. For example, solutions for parenteral use, containing 1 percent of the $b$-racemate of ethyl α-phenyl-α-piperidyl-(2)-acetate hydrochloride may be prepared as follows:

Ingredients:

| | |
|---|---:|
| $b$-Racemate of ethyl α-phenyl-α-piperidyl-(2)-acetate hydrochloride_____g__ | 10.00 |
| Potassium acid phthalate_____g__ | 7.67 |
| Hydrochloric acid 37%_____ml__ | 1.43 |
| Benzyl alcohol_____ml__ | 10.00 |
| Water for injection, q.s. 1000.00 ml. | |

The potassium acid phthalate is dissolved in 800 ml. of water for injection and the hydrochloric acid is added. The $b$-racemate of ethyl α-phenyl-α-piperidyl-(2)-acetate hydrochloride is dissolved in this solution. Then the benzyl alcohol is added to the solution and mixed. The solution is brought up to volume with water for injection. The solution is filtered through a medium porosity sintered glass filter. The required amounts of solution is filled into vials or ampules, and the containers are sterilized.

An elixir, containing 0.2 percent of the $b$-racemate of ethyl α-phenyl-α-piperidyl-(2)-acetate may be prepared as follows:

Ingredients:

| | |
|---|---:|
| $b$-Racemate of ethyl α-phenyl-α-piperidyl-(2)-acetate hydrochloride _____g__ | 2.000 |
| Ethanol _____ml__ | 150.000 |
| Sorbitol (70 percent solution) _____ml__ | 500.000 |
| Glycerin _____ml__ | 50.000 |
| Benzoic acid _____g__ | 1.500 |
| Citric Acid _____g__ | 0.100 |
| FD & C Red No. 2_____g__ | 0.095 |
| FD & C Violet No. 1 _____g__ | 0.005 |
| Imitation raspberry flavor _____ml__ | 0.100 |
| Distilled water, q.s. _____ml__ | 1000.000 |

The $b$-racemate of ethyl α-phenyl-α-piperidyl-(2)-acetate hydrochloride is dissolved in distilled water and the citric acid, the sorbitol solution and the glycerin are added in succession and mixed well. The benzoic acid is dissolved in ethanol and then given to the parent solution while stirring constantly. The color solution and the flavor are added to the solution and the volume is brought to 1000 ml. with water. The finished elixir is filtered and bottled.

Tablets, containing from about 5 to about 30 mg. of the $b$-racemate or the $b_1$-antipode of ethyl α-phenyl-α-piperidyl-(2)-acetate or salts thereof may be prepared according to standard methods. For example, tablets (total weight 0.150 g.) containing 0.010 g. of ethyl α-phenyl-α-piperidyl-(2)-acetate hydrochloride may be prepared as follows (for 1,000,000 tablets):

Ingredients:

| | |
|---|---:|
| $b$-Racemate of ethyl 2-phenyl-α-piperidyl-(2)-acetate hydrochloride _____g__ | 10,000 |
| Lactose, U.S.P. _____g__ | 118,997 |
| Tragacanth BC, U.S.P. _____g__ | 3,000 |
| Talcum, U.S.P. _____g__ | 7,500 |
| Magnesium stearate _____g__ | 750 |
| Sucrose _____g__ | 2,250 |
| Carbowax 6000 _____g__ | 7,500 |
| Purified water _____ml__ | 1,200 |
| 3A alcohol, 50% _____ml__ | 9,000 |
| FD & C Blue No. 2 _____g__ | 3 |

The tragacanth BC, the lactose, the talcum, the magnesium stearate and the $b$-racemate of ethyl α-phenyl-α-piperidyl-(2)-acetate hydrochloride are placed in a mixer and mixed for thirty minutes at slow speed. The color is dissolved in 500 ml. of water, the sucrose in 1500 ml. of water and the Carbowax 6000 in 3500 ml. of water, by applying heat if necessary. To the Carbowax solution is added 4000 ml. of 3A alcohol and mixed well. The color, sucrose and Carbowax solutions are blended and then used to granulate the powder mix. The container that held the granulating solution is rinsed with 500 ml. of 3A alcohol and 200 ml. of water and the rinsings are added to the mixer. The granulation is allowed to mix for twenty minutes and is then passed through a No. 10 screen. After drying to about 1 to 2 percent moisture content, the dried granulation is rescreened through a No. 16 screen and compressed into tablets by using $\%_{32}''$ of punches and dies.

What is claimed is:

1. A liquid pharmaceutical composition for parenteral administration, consisting essentially of from about 0.1 to about 10 percent of a member of the group consisting of the $b$-racemate and the $b_1$-antipode of ethyl α-phenyl-α-piperidyl-(2)-acetate and therapeutically acceptable acid addition salts thereof, together with an aqueous pharmaceutically acceptable carrier.

2. Composition according to claim 1 which contains about 1 percent of the $b$-racemate of ethyl α-phenyl-α-piperidyl-(2)-acetate hydrochloride.

3. A liquid pharmaceutical composition for oral administration consisting essentially of from about 0.1 to about 10 percent of a member of the group consisting of the $b$-racemate and the $b_1$-antipode of ethyl α-phenyl-α-piperidyl-(2)-acetate and therapeutically acceptable acid addition salts thereof together with an aqueous pharmaceutically acceptable carrier.

4. Composition according to claim 3, which contains about 0.2 percent of the $b$-racemate of ethyl α-phenyl-α-piperidyl-(2)-acetate hydrochloride.

References Cited in the file of this patent

UNITED STATES PATENTS

| | | |
|---|---|---|
| 2,507,631 | Hartmann et al. | May 16, 1950 |
| 2,774,789 | Tullar | Dec. 18, 1956 |
| 2,838,519 | Rometsch | June 10, 1958 |

OTHER REFERENCES

Crook et al.: J. Am. Chem. Soc., vol. 52, pp. 4006–4010, 1930.

Panizzon: Helv. Chim. Acta, vol. 27, pp. 1748–1756 (1944).

Fieser and Fieser: Org. Chem., 3rd Ed., pp. 264–7 (1956).

UNITED STATES PATENT OFFICE
CERTIFICATE OF CORRECTION

Patent No. 2,986,494　　　　　　　　　　　　　　May 30, 1961

Leon Lachman et al.

It is hereby certified that error appears in the above numbered patent requiring correction and that the said Letters Patent should read as corrected below.

Column 1, line 68, for "prefer", second occurrence, read -- prepare --; column 3, line 41, for "α-racemate" read -- a-racemate --; line 52, for "allower" read -- allowed --.

Signed and sealed this 9th day of January 1962.

(SEAL)
Attest:

ERNEST W. SWIDER　　　　　　　　　　　　　DAVID L. LADD
Attesting Officer　　　　　　　　　　　　　　Commissioner of Patents